United States Patent [19]

Wilson

[11] Patent Number: 5,008,124
[45] Date of Patent: Apr. 16, 1991

[54] DRY MIX FOR PREPARATION OF IN-SITU SAUCE FOR FOODSTUFFS

[75] Inventor: Mildred N. Wilson, Wilton, Conn.

[73] Assignee: Nabisco Brands, Inc., East Hanover, N.J.

[21] Appl. No.: 445,915

[22] Filed: Dec. 4, 1989

Related U.S. Application Data

[63] Continuation of Ser. No. 222,719, Jul. 21, 1988, abandoned.

[51] Int. Cl.$^5$ .......................... A23L 1/522; A23L 1/54
[52] U.S. Cl. ..................................... 426/589; 426/578; 426/652; 426/243; 426/523; 426/302; 426/305
[58] Field of Search ................. 426/589, 573, 578, 96, 426/302, 305, 654, 243, 523

[56] References Cited

U.S. PATENT DOCUMENTS

| | | | |
|---|---|---|---|
| 3,235,385 | 2/1966 | Cull | 99/1 |
| 3,582,362 | 6/1971 | Drews et al. | 99/144 |
| 3,586,512 | 6/1971 | Mancuso et al. | 99/100 |
| 3,598,614 | 8/1971 | Hsu | 99/145 |
| 3,676,158 | 7/1972 | Fischer et al. | 99/166 |
| 3,681,094 | 8/1972 | Rogers et al. | 99/187 |
| 3,723,137 | 3/1973 | Fischer et al. | 99/166 |
| 3,752,678 | 8/1973 | Jenkinson et al. | 99/136 |
| 3,843,827 | 10/1974 | Lee et al. | 426/293 |
| 3,852,501 | 12/1974 | Fazzina et al. | 426/293 |
| 3,952,110 | 4/1976 | Knight et al. | 426/296 |
| 3,956,515 | 5/1976 | Moore et al. | 426/302 |
| 4,068,009 | 1/1978 | Rispoli et al. | 426/291 |
| 4,199,603 | 4/1980 | Sortwell et al. | 426/92 |
| 4,208,442 | 6/1980 | Evans et al. | 426/296 |
| 4,218,485 | 8/1980 | Lee et al. | 426/296 |
| 4,260,637 | 11/1981 | Rispoli et al. | 426/96 |
| 4,367,242 | 1/1983 | Jarvis et al. | 426/293 |
| 4,375,484 | 3/1983 | Lee et al. | 426/549 |
| 4,415,599 | 11/1983 | Bos | 426/578 |
| 4,418,090 | 11/1983 | Bohrmann et al. | 426/578 |
| 4,496,601 | 1/1985 | Rispoli et al. | 426/554 |
| 4,504,509 | 3/1985 | Bell et al. | 426/549 |
| 4,511,583 | 4/1985 | Olson et al. | 426/305 |
| 4,518,618 | 5/1985 | Hsia et al. | 426/262 |
| 4,518,620 | 5/1985 | Monagle et al. | 426/291 |
| 4,529,607 | 7/1985 | Lenchin et al. | 426/94 |
| 4,588,600 | 5/1986 | Suderman | 426/555 |
| 4,595,597 | 6/1986 | Lenchin et al. | 426/555 |
| 4,596,715 | 6/1986 | Ballard et al. | 426/573 |
| 4,597,974 | 7/1986 | Fonteneau et al. | 426/129 |
| 4,640,837 | 2/1987 | Coleman et al. | 426/94 |
| 4,675,197 | 6/1987 | Banner et al. | 426/292 |
| 4,704,294 | 11/1987 | Rakosky | 426/578 |
| 4,735,812 | 4/1988 | Bryson | 426/305 |

FOREIGN PATENT DOCUMENTS 0258957  3/1988  European Pat. Off. .

*Primary Examiner*—Jeanette Hunter

[57] ABSTRACT

A dry mix is provided, containing as essential components xanthan gum and ungelatinized starch, for use in application to uncooked or cooking meat pieces so as to develop a thickened sauce for the meat during the meat cooking process. The dry mix can be first reconstituted to form a somewhat viscous liquified mixture which is then poured over the meat and develops into a more viscous sauce during the cooking process. Alternatively, the dry mix can be applied directly to moistened meat pieces and hydrated thereon with additional water, after which a thickened sauce similarly develops during the meat cooking process.

5 Claims, No Drawings

DRY MIX FOR PREPARATION OF IN-SITU SAUCE FOR FOODSTUFFS

This is a continuation of copending application Ser. No. 07/222,719 filed on July 21, 1988 now abandoned.

BACKGROUND OF THE INVENTION

The present invention relates to a dry mix for use in preparing sauces for foodstuffs, and more particularly, to a dry mix capable of producing a sauce incident to the process of cooking the foodstuffs.

It is well-known, of course, that the palatability of many foods such as meat and poultry can be enhanced through the provision of a sauce (or gravy) on or in association with the food. These sauces can run the gamut from simply the natural juices exuded by the meat or poultry during cooking, sauces which are prepared utilizing natural meat juices (e.g., such as where starch or flour is added to pan drippings), and sauces which are separately prepared independent of the cooking of the meat or poultry.

As a convenience to the consumer, a number of products exist in the market which are pre-packaged combinations of meat or poultry and a thickened gravy, which products may then be thawed and heated or cooked by the consumer to provide a meat-in-gravy entree. See, e.g., U.S. Pat. No. 4,597,974 to Fonteneau, et al. and U.S. Pat. No. 3,681,094 to Rogers, et al.

Many consumers prefer, however, to utilize their own selected and purchased meats in preparing meals. As a convenience to these consumers, there is available in the market a wide variety of dry mixes which can be reconstituted with boiling water and/or meat juices to produce a thickened sauce which can then be served on or in association with the meat, e.g., in the nature of a brown gravy for beef or a chicken gravy or the like. See, for example, U.S. Pat. No. 4,415,599 to Bos; U.S. Pat. No. 4,418,090 to Bohrmann, et al.; and U.S. Pat. No. 4,704,294 to Rakosky.

Even with dry mixes, however, there is still a matter of inconvenience associated with the need to separately prepare the sauce while separately preparing (i.e., cooking) the meat course. Also, for a number of products, it is desirable for the sauce to develop along with the meat in order to obtain the full benefit of the meat flavors into the sauce as well as to obtain the full benefit of the sauce ingredients into the meat.

SUMMARY OF THE INVENTION

The primary aim of the present invention is to provide for the consumer a dry mix preparation which is capable of developing into a thickened gravy or sauce when cooked along with the meat. According to one embodiment of the invention, the dry mix is first reconstituted in hot or cold tap water where it rapidly develops into a liquid having a viscosity which, while thicker than water, is not as thick as the ultimately desired sauce. In its thus liquified condition, the mix can then be poured on and over meat or meat pieces in a cooking utensil, its viscosity being such that at least some of the mix will remain on the meat surfaces while the remainder seeps down to the bottom of the utensil. During the cooking of the meat, ingredients in the now liquified mix cause the mix to thicken into the final desired sauce viscosity, while at the same time juices and fats cooked out from the meat intermix with the sauce and further enhance its flavor and texture.

According to this first embodiment of the invention, the consumer is provided with the convenience of a dry mix preparation which does not require separate rehydration and cooking in order to produce a sauce for the meat. Instead, the mix is formulated so as to be rapidly liquified in ordinary hot or cold tap water, enabling it to be applied on the meat before or during cooking, and the meat cooking process then converts the liquified mix, in situ, into the desired viscous sauce in direct association with the meat. As discussed hereinafter, significant technical problems are encountered in the formulation of a dry mix evidencing these capabilities and characteristics, and the invention is at least in part predicated upon the solution to those problems.

In a second embodiment of the invention, the dry mix can be applied directly to moistened meat pieces prior to or during cooking. The composition of the dry mix is formulated such that at least a portion thereof will be retained on the meat pieces during cooking, and there liquify to produce a sauce of desired viscosity in association with the meat. Portions of the dry mix which do not remain adherent to the meat upon application thereto find their way to the bottom of the cooking utensil and there liquify to produce additional sauce in association with the meat.

In this second embodiment, the consumer is provided with a dry mix requiring nothing more than sprinkling on or over moistened meat pieces, generally followed by application of tap water thereover, to produce a sauce in situ as the meat is cooked to its final state. Here too, the solution to a number of technical problems associated with provision of a dry mix having the capabilities and characteristics sought is at least in part the predicate for the invention herein.

Of further significance is the ability to formulate a single dry mix which possesses the necessary capabilities and characteristics to enable its use according to either of the foregoing embodiments regarding its use by the consumer. As such, the consumer is afforded significant convenience and latitude in how to employ the product without need for purchase of different products for each different method of use.

The key aspects of the dry mix according to the present invention reside in the conjoint use of xanthan gum and a common food grade ungelatinized starch, i.e., a starch which requires heating, in the presence of aqueous medium, to develop its thickening properties. In addition to these key components, the dry mix may contain a wide variety of flavorants, colorants, bulking agents, spices and the like depending upon the particular sauce product sought to be produced.

According to the first embodiment of the invention, the dry mix is initially hydrated or reconstituted in ordinary hot or cold tap water. The formulation of the dry mix is such that this initial liquification of the mix occurs rapidly and produces a liquid mix more viscous than water but less viscous than the ultimately desired sauce. The thicker-than-water viscosity is necessary in order to permit the liquid mix to be applied onto uncooked or cooking meat pieces and for at least a portion of it to remain on the meat pieces, while remaining portions of the applied liquid mix seep down to the bottom of the cooking utensil. The xanthan gum in the dry mix is relied upon to produce this initial semi-thick liquid upon admixture of the dry mix with water, and enables the semi-thick liquid to be produced rapidly using hot or cold tap water. Because of the nature of the starch employed, i.e., requiring heating to develop its thickening properties, the starch component contributes little, if at all, to the required viscosity of the initial liquified mix, except insofar as simply providing solids therein.

During the cooking of the meat, the initial liquified mix develops further viscosity and thickness, to that of the final desired sauce, as the starch component of the liquified mix undergoes progressive swelling and loss of birefringence under the influence of the heat of cooking and in the presence of the moisture originally present in the liquified mix and additional moisture from the cook-out juices of the meat. At the end of the meat cooking process, the liquified mix, by virtue of the xanthan gum component and the now swelled starch component, has developed into a desirably thickened sauce both on the meat and in the bottom of the cooking utensil.

The combined use of xanthan gum and the starch component is essential to the provision of a dry mix which can be employed in the above-described manner. Reliance on the starch alone to provide both an initial semi-thick liquified mix and an eventual sauce of yet further increased viscosity is ineffective, particularly in its inability to rapidly provide, with hot or cold tap water, a liquified mix of the proper viscosity and consistency to effect the application to meat pieces in a way which retains at least a portion of the liquified mix on the meat. While cold-water swelling and/or pregelatinized starches are known and might be effective to produce the initially desired liquified mix in a fairly rapid manner with hot or cold tap water, these starches do not develop sufficient further viscosity during cooking to be useful in providing a sauce of the desired thickness at the end of the cooking sequence, and, further, do not provide sauces of desired consistency and smoothness. While it might in theory be possible to formulate a dry mix with a sufficient quantity of such starches to develop in the initial liquified mix a viscosity of that desired in the final sauce product, the amount of starch required adversely affects the final sauce consistency, taste and flavor, rapid hydration in hot or cold tap water would be difficult, and, of primary importance, a so-prepared initially highly viscous mix leads to significant difficulties in application to the meat and inability to develop any sauce in the bottom of the cooking utensil.

By the same token, reliance on the xanthan gum alone to provide both the initially thickened liquified mix and the ultimately desired sauce of yet further thickness is ineffective. In particular, attempted use of xanthan alone to develop the desired final viscosity leads to a sauce of very stringy consistency, distinctly unlike the smooth consistency required for most sauces. Moreover, proceeding in this manner leads to an initial liquified mix which is so viscous and stringy as to lead to difficulties in application of the liquified mix to the meat pieces and makes it difficult to produce any sauce in the bottom of the cooking utensil.

In order to achieve the essential properties and characteristics for use of the dry mix in the manner above described, the amounts of xanthan and starch must be carefully controlled within defined limits. As can be appreciated, however, these limits are more easily expressed on the basis of the initially liquified mix rather than as proportions or percentages of the dry mix, which may contain a wide variety of ingredients such as flavorants, spices, colorants, bulking agents and the like. Accordingly, the dry mix should contain xanthan gum in an amount which will provide in the initially liquified mixture a xanthan gum concentration of about 0.003 to about 0.005 grams/ml., more preferably from about 0.0035 to about 0.0045 grams/ml., and most preferably from about 0.0038 to about 0.0042 grams/ml. Thus, for a dry mix to be reconstituted in one cup of water (about 237 ml.), the foregoing ranges would be provided by having about 0.7 to about 1.2 grams of xanthan gum in the mix, preferably from about 0.83 to about 1.16 grams, and more preferably from about 0.9 to 1.05 grams.

With regard to the starch component, which may be a single starch or a combination of starches, its presence in the dry mix should be sufficient to provide from about 0.010 to about 0.020 grams/ml. in the initially liquified mix, preferably from about 0.012 to about 0.018 grams/ml., and most preferably from about 0.013 to about 0.014 grams/ml. Here again, for a mix which is intended to be reconstituted in one cup of water, the foregoing ranges would be provided by having about 2.37 to about 5.74 grams of starch in the dry mix, preferably from about 2.9 to about 4.27 grams, and most preferably from about 3.08 to about 3.32 grams.

The actual percentage of these ingredients in the dry mix per se is, of course, simply a function of the additional and varied ingredients which may be present in the mix.

In accordance with the second embodiment of the invention, the dry mix preparation is not subjected to separate initial liquification apart from the meat but rather is applied to moistened meat pieces and then further moistened in contact with the meat by addition of water. By reason of this procedure, and the formulation of the dry mix, at least a portion of the dry mix remains on the meat pieces and at least a portion is washed down to the bottom of the cooking utensil. Upon cooking of the meat, the dry mix (which is actually moistened and to a degree hydrated at this point) develops the viscosity desired in the ultimate sauce product by virtue of the heating and additional hydration with cook-out juices from the meat.

As in the previous embodiment, the xanthan and starch act conjointly to develop the eventually desired viscosity and consistency for the final sauce. In this embodiment, the xanthan serves at least to a degree the function served in the first embodiment, i.e., by virtue of its rapid hydration it is capable of providing sufficient viscosity when water is poured over the applied dry mix to maintain at least a portion of the mix on the meat pieces as cooking commences and progresses. In addition, the xanthan is such as to provide the dry mix with sufficient adhesiveness, when the mix is applied to moistened meat pieces, to permit at least a portion of the dry mix to remain on the meat pieces when water is applied thereover, but not so adhesive as to prevent at least some of the mix to be washed down to the bottom of the cooking utensil.

When the cooking process is by way of microwave oven, the xanthan serves an additional important function in preventing the moistened dry mix from being dislodged off the meat pieces as the meat undergoes the "insideout" evolution of moisture which characterizes microwave heating.

As with the previous embodiment, the xanthan and starch are essential ingredients and the preparation of a dry mix exhibiting the properties and characteristics which enable it to be used according to this method cannot be achieved by complete reliance on one or the other of the components or by alternative means for providing thickened liquids.

As noted earlier, part of the significant advantage of the dry mix of the present invention is that a single formulation of it may be used in either of the application and use embodiments described. Thus, with respect to the second embodiment, the dry mix can contain the same amounts of xanthan and starch component as are required to be present for making the dry mix suitable for use according to the first embodiment. Here again, even though the dry mix is not separately rehydrated as such, it nevertheless is most convenient to express the amounts of xanthan and starch in the dry mix as being that sufficient to produce, in one cup of water, the particular gram/ml. amounts of the components, as earlier set forth. With these amounts present in the dry mix, the mix will possess the capability of at least a portion thereof adhering to pre-moistened meat pieces; at least a portion thereof remaining in a somewhat hydrated condition on the meat pieces after water is poured thereover (unless of course excessive water is used or is "poured" in some overly vigorous manner) and at least a portion thereof washing down to the bottom of the cooking utensil; at least a portion of the somewhat hydrated mix remaining on the meat pieces even under influence of microwave cooking; and, finally, resulting in a thickened sauce upon and incident to cooking of the meat pieces.

The dry mix of the invention can be formulated to provide a wide variety of traditional and/or unique sauces by provision of flavorants, colorants, spices and other such components associated with the desired sauce. Of particular importance is the ability of the dry mix of the invention to be formulated to produce spicy or hot sauces such as generally associated with Mexican cuisine. The seasonings and other ingredients required to prepare such sauces as a dry mix generally result in a mix which is significantly acidic when dissolved in water, e.g., resulting in a pH range of from about 3.0 to about 4.5. During cooking, exuded meat juices and fats may tend to bring the pH to a more neutral level, but the dry mix per se begins as fairly acidic. Many thickening agents operate only poorly, if at all, in acidic medium and are not particularly stable in such a medium. The xanthan gum used in the preparations of this invention, and in the amounts employed, exhibits excellent stability even in acidic media, and thus enables the mixes to be formulated to provide a wide variety of such sauces.

The dry mix preparations typically will include an emulsifier, particularly when the meat on which it is used is of the type which will exude significant levels of fat during cooking. The amount of emulsifier employed is that which functionally is sufficient to at least partially stably intermix aqueous and fat phases, and specifically will be dependent upon the particular emulsifier employed and the type of meat product for which the mix is prepared. Generally speaking, the amount of emulsifier in the mix is that which will provide from about 0.003 to about 0.008 grams/ml. when the mix is reconstituted in one cup of water.

The dry mix preparations according to the invention also will generally contain a variety of flavorants, colorants, seasonings, filling and bulking agents, and the like. In general these ingredients will constitute in total a fairly large percentage of the dry mix. To a sometimes significant degree, these ingredients add body and/or thickness to both the initially hydrated mix and the eventual sauce, and that fact is taken into account in choosing appropriate levels of xanthan and starch to provide the required initial and final viscosities as earlier described.

The dry mix preparations can if desired be mixed with additional ingredients supplied by the consumer or by the manufacturer (e.g., in a separate package) before application to the meat pieces. For example, onions and/or peppers in diced and/or dehydrated form may be added to a dry mix to arrive at the ingredients needed for a Mexican seasoning sauce and, again, to the extent these ingredients will add body or thickness to the initially hydrated mix or final sauce, their contribution is taken into account in choosing the appropriate xanthan and starch levels in the mix.

DETAILED DESCRIPTION OF THE INVENTION

As used throughout this application, "meat" is intended to mean the flesh of animals which are typically considered sources of food for humans, and in particular includes meats derived from cows, pigs, lambs, turkeys, chickens, and the like.

"Sauce" is used throughout this application to describe liquid preparations, more viscous than water, which are consumed on or in association with cooked meats, and includes preparation sometimes more traditionally referred to as gravies.

The dry mix preparations of this invention typically are prepared by dry blending of the various ingredients in any particular sequence desired, although there may be situations where a particular dry blending sequence is more advantageous than others or where certain of the ingredients are first separately dry blended and then admixed with the remaining ingredients. Generally speaking, the final dry mix is not completely dry in the sense of being completely free from water, since many of the individual ingredients may have a slight moisture content associated therewith. Typically, the moisture content of the dry mix is low enough to ensure long term stability of the mix against spoilage without elaborate protective packaging or storage techniques, as well as ensuring a free-flowable product, and generally will be less than about 6% by weight and, more preferably, less than about 4% by weight.

As can be appreciated from the earlier discussion, the xanthan and starch component of the dry mix, while the essential ingredients thereof, are present in relatively small amounts. Typically the other ingredients of the dry mix which are required to produce a sauce of any particular type (e.g., seasonings, flavors, acidic ingredients) will add sufficient bulk to the dry product to permit it to be liberally sprinkled over the meat pieces in that embodiment of the invention. However, it often is necessary or desirable to further include additional bulking or filling agents (typically non-sweet carbohydrates such as low D.E. maltodextrins) to achieve a particular bulk density and package filling weight.

The xanthan gum employed as an essential ingredient in the dry mix is a high molecular weight polysaccharide derived from xanthomonas campestris, containing D-glucose units, D-mannose units and D-glucoronic acid units as its predominant monosaccharide units. A particularly suitable form of xanthan gum is available under the tradename Keltrol and/or Keltrol F from the Kelco Division of Merck & Co., Inc., Rahway, N.J., and typically has a viscosity between about 1200 to 1600 centipoise in a 1% solution as measured with a Brookfield Viscometer at 25° C. using a No. 3 spindle and a spindle speed of 60 r.p.m. The physical form of these xanthan gum products (fine particles from about 70 to 250 microns in diameter) make them quite suitable for blending to form the dry mix preparations of this invention.

The starch component, which may be a single starch or a combination of such starches, can be any food-grade ungelatinized starch product from any suitable source, such as corn, tapioca, waxy maize, rice, arrowroot, and other like starches. The starch can if desired be one which has been physically or chemically modified to produce a variety of characteristics relating to color, odor or, more traditionally, swelling and viscosity. The essential criteria for selection of the starch is that it be one which fully develops its thickening properties only upon heating in aqueous medium, and thus is distinguished from so-called pre-gelatinized starches, cold-water swelling starches, instant starches and the like. The starches for use in this invention are traditionally referred to as "cook-up⇌ starches.

The dry mix preparations of the invention will rarely, if ever, contain a fat or oil component in any substantial proportion (generally less than about 0.005 gms/ml. in the liquified dry mix or, for use in the second embodiment of the invention, the same concentration based on one cup of water), although the sauce which results therefrom generally will contain fat by reason of inclusion therein of fat exuded by the meat product during cooking.

In either of the embodiments for use of the dry mix preparations of this invention, it is generally intended that the dry mix or the liquified dry mix, as the case may be, be applied to uncooked meat pieces arranged in a cooking utensil prior to the meat-cooking process. There may be situations, however, where the meat cooking process and the heating necessary to develop the sauce are widely different and run risk that components of the sauce or dry mix will overcook or burn during the full cycle of the meat-cooking process. In such situations, it may be necessary or desirable to delay the application of the dry mix or liquified dry mix until a certain period of meat cooking already has occurred.

As an example of a dry mix according to the invention, there can be prepared a Mexican chicken seasoning mix utilizing the following ingredients within the indicated weight ranges:

| Ingredient | Grams |
| --- | --- |
| Tomato Powder | 5.2–5.6 |
| Salt | 5.2–5.6 |
| Maltodextrin (7-10 D.E.) | 5.2–5.6 |
| Modified Food Starch (National Starch Co., PURE-FLO starch) | 3.25–3.45 |
| Corn Flour | 1.8–2.0 |
| Emulsifier | 1.2–1.4 |
| Citric Acid | 1.2–1.4 |
| Xanthan gum (Keltrol F) | 0.9–1.05 |
| Vegetable oil | 0.8–1.0 |
| Flavors, colors, spices | 10.0–12.0 |

The foregoing ingredients are prepared and packaged as a dry mix (36.3 grams). For use, the dry mix is further mixed with a separately prepared and packaged blend of dehydrated onions and peppers (6.27 grams). The combined mixes are then dissolved and stirred in one cup of tap water to produce a liquified dry mix having a viscosity of about 400–500 cps and a pH of about 3.7, and the liquified dry mix then poured over from two and one-half to three pounds of uncooked chicken pieces arranged in suitable cooking pot. By virtue of the xanthan gum and other bodying ingredients in the mix (e.g., tomato powder), portions of the liquified dry mix easily cling to the surfaces of the chicken pieces which it contacts while the remainder of the dry mix seeps down to the bottom of the cooking utensil. The chicken and liquified mix are then cooked in a conventional oven for sixty (60) minutes (approximate temperature of 400° F.). After the cooking is completed, the liquified dry mix is found to have converted into a more viscous Mexican sauce which is present both on the chicken pieces and at the bottom of the cooking utensil. After removal of the cooked chicken pieces, sauce remaining in the cooking utensil requires only brief stirring to incorporate cooked out juices and fats and served along with the chicken.

The exact same dry mix and additional onion/pepper dry mix can be admixed and sprinkled over from two and one-half to three pounds of premoistened uncooked chicken pieces arranged in a cooking utensil, it being found that a substantial portion of the dry admixture remains on the surfaces of the pieces. Thereafter, one cup of water is poured over the chicken pieces, with the result that some of the dry admixture washes off the chicken down to the bottom of the utensil while a portion of the dry admixture hydrates to a thicker-than-water viscosity and clings to the chicken pieces. The chicken and sauce precursor are cooked in a microwave oven for ten minutes; thereafter, a portion of the thickened sauce which forms at the bottom of the cooking utensil is used to baste the chicken pieces, followed by an additional twenty minutes in the microwave, another basting, and five additional minutes of microwave cooking. The cooked chicken is found to have a thick Mexican sauce on most of the pieces, and the sauce in the bottom of the pan is stirred to provide yet additional sauce for consumption with the chicken. In the particular formulation employed, the ingredients provide sufficient browning of the chicken, as is often difficult to achieve in microwave cooking. However, in formulations where the basic ingredients per se do not effect the desired browning, the dry mix can be augmented with appropriate ingredients which will enhance microwave browning so long as they do not detract from the desired sauce end product or interfere with its formation.

Although the invention has been described with reference to particular embodiments and examples, these have been provided for illustrative purposes only and are not intended to limit the scope of the invention as defined in the appended claims.

What is claimed is:

1. A dry mix preparation suitable for application to uncooked or partially cooked meat as either a dry mix or a liquefied dry mix, and which develops into a thickened sauce for the meat during the meat cooking process, said dry mix comprising xanthan gum, in an amount which will provide from about 0.003 to about 0.005 grams/ml. of xanthan gum based upon dissolution of the mix in one cup of water, and an ungelatinized food-grade starch, in an amount which will provide from about 0.01 to about 0.02 grams/ml. of said starch based upon dissolution of the mix in one cup of water, and further comprising flavorants and additional ingredients necessary to provide the particular type of sauce desired and such that an aqueous solution of said dry mix has a pH of from about 3.0 to about 4.5

2. A dry mix preparation according to claim 1 wherein said xanthan gum is present in an amount which will provide from about 0.0035 to about 0.0045 grams/ml. of xanthan gum based upon dissolution of the mix in one cup of water, and wherein said ungelatinized food-grade starch is present in an amount which will provide from about 0.012 to about 0.018 grams/ml. of said starch based upon dissolution of the mix in one cup of water.

3. A method for preparing and cooking uncooked or partially cooked meat so as to develop during such cooking a thickened sauce on or in association with said meat, comprising the steps of dissolving in hot or cold tap water a dry mix comprising xanthan gum, ungelatizized food-grade starch and suitable flavorants so as to provide a hydrated mix, more viscous than water, containing xanthan gum at a concentration of from about 0.003 to about 0.005 grams/ml. and ungelatinized food-grade starch at a concentration of from about 0.01 to about 0.02 grams/ml. and having a pH of from about 3.0 to about 4.5; pouring said hydrated mix over uncooked or partially cooked meat arranged in a cooking vessel such that at least a portion of said hydrated mix adheres to exposed surfaces of said meat; and thereafter cooking said meat, in association with said hydrated mix, at conditions which will cause the ungelatinized starch component of the hydrated mix to undergo progressive swelling and loss of birefringence, such that upon completion of the cooking there has developed in association with the meat a thickened sauce more viscous than the initially hydrated mix.

4. A method for preparing and cooking uncooked or partially cooked meat so as to develop during such cooking a thickened sauce on or in association with said meat, comprising the steps of arranging uncooked or partially cooked meat in a cooking utensil; moistening the exposed surfaces of the meat; applying to the moistened meat a dry mix comprised of xanthan gum, ungelatinized food-grade starch and suitable flavorants, such that at least a portion of said dry mix adheres to exposed surfaces of said moistened meat; thereafter pouring water over said meat in a manner such that at least a portion of said dry mix on the exposed meat surfaces remains adhered thereon, wherein the xanthan gum present in said dry mix is in an amount which will provide from about 0.003 to about 0.005 grams/ml. of xanthan gum in the amount of water poured over said meat, and wherein the ungelatinized food-grade starch present in said dry mix is in an amount which will provide from about 0.01 to about 0.02 grams/ml. of said starch in the amount of water poured over said meat, and wherein a solution of said dry mix in the amount of water poured over said meat has a pH of from about 3.0 to about 4.5; and thereafter cooking said meat in association with said mix and water at conditions which will cause the ungelatinized food-grade starch of said mix to undergo progressive swelling and loss of birefringence, such that upon completion of the cooking there has developed in association with the meat a thickened sauce.

5. The method according to claim 4 wherein said cooking is achieved by application of microwave energy.

* * * * *

UNITED STATES PATENT AND TRADEMARK OFFICE
CERTIFICATE OF CORRECTION

PATENT NO. : 5,008,124

DATED : April 16, 1991

INVENTOR(S) : Mildred N. Wilson and Therese Astorino

It is certified that error appears in the above-identified patent and that said Letters Patent is hereby corrected as shown below:

On Title Page: Item [75] add "Therese Astorino" as a co-inventor.

Signed and Sealed this

First Day of September, 1992

*Attest:*

DOUGLAS B. COMER

*Attesting Officer*     *Acting Commissioner of Patents and Trademarks*